(12) United States Patent
Yabuuchi et al.

(10) Patent No.: US 10,479,209 B2
(45) Date of Patent: Nov. 19, 2019

(54) RELAY DEVICE INCLUDING A RESTRICTION UNIT

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP); TOYOTA JIDOSHA KABUSHIKI KAISHA, Toyota-shi, Aichi (JP)

(72) Inventors: Yasuhiro Yabuuchi, Yokkaichi (JP); Nobuyuki Nakagawa, Toyota (JP); Ryuichi Kamaga, Toyota (JP)

(73) Assignees: AUTONETWORK TECHNOLOGIES, LTD., Mie (JP); SUMITOMO WIRING SYSTENSM LTD., Mie (JP); SUMITOMO ELECTRIC INDUSTRIES, LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 15/750,114

(22) PCT Filed: Jul. 28, 2016

(86) PCT No.: PCT/JP2016/072118
§ 371 (c)(1),
(2) Date: Feb. 2, 2018

(87) PCT Pub. No.: WO2017/022606
PCT Pub. Date: Feb. 9, 2017

(65) Prior Publication Data
US 2018/0236888 A1 Aug. 23, 2018

(30) Foreign Application Priority Data

Aug. 5, 2015 (JP) .................................. 2015-155423

(51) Int. Cl.
*H02J 7/00* (2006.01)
*B60L 11/18* (2006.01)
(Continued)

(52) U.S. Cl.
CPC ......... *B60L 11/1838* (2013.01); *B60L 3/0069* (2013.01); *B60L 3/04* (2013.01);
(Continued)

(58) Field of Classification Search
CPC .................................................. B60L 11/1838
(Continued)

(56) References Cited

U.S. PATENT DOCUMENTS 5,548,200 A * 8/1996 Nor ........................ B60L 53/305
320/109
6,940,254 B2 * 9/2005 Nagamine .............. G06Q 30/06
320/109
(Continued)

FOREIGN PATENT DOCUMENTS

JP   H11-135159 A   5/1999
JP   2014-117975 A  6/2014
(Continued)

OTHER PUBLICATIONS

Oct. 4, 2016 International Search Report issued in International Patent Application No. PCT/JP2016/072118.

*Primary Examiner* — Yalkew Fantu
(74) *Attorney, Agent, or Firm* — Oliff PLC (57) ABSTRACT

A relay device provided in vehicle having a battery, converting control signal formats, and relaying same between: a first communications unit that sends and receives control (Continued)

signals in a first format relating to charging; and second communications unit that supplies DC voltage, is provided in a charging station that charges battery, and sends and receives control signals in a second format relating to charging. The relay device includes: a limiting unit that limits power supplied between charging station and battery, regardless of vehicle side control performed on control signals' basis; an acquisition unit that obtains DC voltage supplied by charging station and obtains the battery's voltage; a determination unit that determines whether the voltage difference between each obtained voltage is less than threshold value; and a release unit that releases the limits by limiting unit if a determination has been made that the voltage difference is less than threshold value.

4 Claims, 7 Drawing Sheets (51) Int. Cl.
*B60L 3/00* (2019.01)
*B60L 3/04* (2006.01)
*H01M 10/44* (2006.01)
*B60L 53/14* (2019.01)
*B60L 53/60* (2019.01)
*B60L 53/18* (2019.01)
*H02J 7/04* (2006.01)

(52) U.S. Cl.
CPC .............. *B60L 53/14* (2019.02); *B60L 53/18* (2019.02); *B60L 53/60* (2019.02); *H01M 10/44* (2013.01); *H02J 7/0027* (2013.01); *H02J 7/0029* (2013.01); *H02J 7/0031* (2013.01); *H02J 7/0052* (2013.01); *H02J 7/04* (2013.01); *H01M 2220/20* (2013.01); *H02J 2007/0001* (2013.01); *H02J 2007/0039* (2013.01); *H02J 2007/0096* (2013.01); *Y02T 10/7005* (2013.01); *Y02T 90/14* (2013.01); *Y02T 90/16* (2013.01)

(58) Field of Classification Search
USPC ........................................................ 320/109
See application file for complete search history.

(56) References Cited

U.S. PATENT DOCUMENTS

| 2005/0035741 | A1* | 2/2005 | Elder | B60L 3/0046 320/116 |
| 2009/0304101 | A1* | 12/2009 | LoPorto | G01D 4/004 375/260 |
| 2012/0323417 | A1* | 12/2012 | Rumer | G01M 15/02 701/22 |
| 2014/0028255 | A1* | 1/2014 | Brimacombe | B60L 11/1824 320/109 |

FOREIGN PATENT DOCUMENTS

JP 2014-124033 A 7/2014
JP 2014-124034 A 7/2014

* cited by examiner

RELAY DEVICE INCLUDING A RESTRICTION UNIT

CROSS-REFERENCE TO RELATED APPLICATIONS

This application is the national phase under 35 U.S.C. § 371 of PCT International Application No. PCT/JP2016/072118 which has an International filing date of Jul. 28, 2016 and designated the United States of America.

FIELD

The present disclosure relates to a relay device that relays control signals to be sent and received between a vehicle having a battery and a charging station for supplying direct current (DC) power to the battery of the vehicle.

BACKGROUND

A plug-in hybrid electric vehicle (PHEV) employing both an electric motor and an engine, and as an electric vehicle (EV) driven by an electric motor without having an engine have been in widespread use. Vehicles such as the plug-in hybrid electric vehicle and the electric vehicle have a battery for driving an electric motor, and charge the battery by using an external charging station.

A method of charging a battery for driving a motor includes AC charging and DC charging. The DC charging standards include the CHAdeMO standard and the Combo standard. The charging station conforming to the CHAdeMO standard has a connector for DC charging and communicates with a vehicle via a Controller Area Network (CAN). Meanwhile, the charging station conforming to the Combo standard has connectors for DC charging and for AC charging, and performs power supply control by confirming the connected state with the vehicle, the completion of the preparation for charging, the state of charge and so on by a control pilot (CPLT) signal sent or received through a communication line.

Various information related to charging is sent and received between a vehicle and a charging station by PLC communication in which a control signal is superposed onto a control pilot signal.

Here, in the case where both of the DC charging standards are employed, a car manufacturer is required to comply with two types of the DC charging standards, resulting in increase in development costs.

Japanese Patent Application Laid-Open Publication No. 2014-124034 and No. 2014-124033 each discloses a relay device that achieves battery charging with electricity from charging stations having different DC charging standards with low costs by converting a control signal related to charging from one format to another and relaying the converted control signal between a vehicle and charging stations that are different in DC charging standards.

SUMMARY

In the relay devices according to Japanese Patent Application Laid-Open Publication No. 2014-124034 and No. 2014-124033, however, even if control signals can normally be sent and received between the vehicle and the charging stations, the occurrence of abnormal current such as reverse current and rush current caused by the potential difference between the voltage value of the battery and the voltage value of the DC power output from the charging stations cannot be prevented.

An object of the present disclosure is to provide a relay device that is able to relay control signals in different formats that are to be sent and received between a vehicle and a charging station, and to prevent abnormal current between the vehicle and the charging station.

A relay device according to one aspect of the present disclosure converting a control signal related to charging from one format to another and relaying the converted control signal between a first communication unit that is provided on a vehicle having a battery and that sends and receives a control signal related to charging in a first format and a second communication unit that is provided on a charging station for supplying DC power to charge the battery and that sends and receives a control signal related to charging in a second format comprises: a restriction unit that restricts energization between the charging station and the battery regardless of control performed by the vehicle based on the control signal; an acquisition unit that acquires a voltage value of the DC power supplied from the charging station and a voltage value of the battery; a determination unit that determines whether or not a voltage difference between the voltage values acquired by the acquisition unit is less than a threshold; and a release unit that releases restriction by the restriction unit if the determination unit determines that the voltage difference is less than the threshold.

The relay device according to one aspect of the present disclosure converting a control signal related to charging from one format to another and relaying the converted control signal between a first communication unit that is provided on a vehicle having a battery and that sends and receives a control signal related to charging in a first format and a second communication unit that is provided on a charging station for supplying DC power to charge the battery and that sends and receives a control signal related to charging in a second format further comprises: a backflow prevention diode that prevents current from flowing back to the charging station from the battery regardless of control performed by the vehicle based on the control signal.

It is noted that the present application may be embodied as a relay device having such characteristic processing units, embodied as a relaying method including such characteristic processing steps, or embodied as a program that causes a computer to execute such steps. Furthermore, the present application may be embodied as a semiconductor integrated circuit for embodying a part or all of the relay device or embodied as another system including the relay device.

According to the above description, it is possible to provide a relay device that is able to relay control signals in different formats that are to be sent and received between the vehicle and the charging station and to prevent abnormal current between the vehicle and the charging station.

The above and further objects and features will more fully be apparent from the following detailed description with accompanying drawings.

DETAILED DESCRIPTION

[Description of Embodiments of the Present Invention]

Embodiments of the present disclosure are first listed. It is noted that at least parts of the embodiments described below may arbitrarily be combined.

(1) A relay device according to one aspect of the present disclosure converting a control signal related to charging from one format to another and relaying the converted control signal between a first communication unit that is provided on a vehicle having a battery and that sends and receives a control signal related to charging in a first format and a second communication unit that is provided on a charging station for supplying DC power to charge the battery and that sends and receives a control signal related to charging in a second format comprises: a restriction unit that restricts energization between the charging station and the battery regardless of control performed by the vehicle based on the control signal; an acquisition unit that acquires a voltage value of the DC power supplied from the charging station and a voltage value of the battery; a determination unit that determines whether or not a voltage difference between the voltage values acquired by the acquisition unit is less than a threshold; and a release unit that releases restriction by the restriction unit if the determination unit determines that the voltage difference is less than the threshold.

According to this aspect, the relay device relays control signals that are to be sent and received between the vehicle and the charging station. The vehicle performs charge control by sending and receiving control signals of the first format while the charging station performs supply control of DC power by sending and receiving control signals of the second format. In the case where the relay device receives a control signal sent from any one of the vehicle and the charging station, the relay device converts the received control signal from one format to another and sends to the other one of the vehicle and the charging station the control signal of the converted format to thereby relay the control signal. Thus, the relay device according to this embodiment allows the vehicle and the charging station even having different charging standards to send and receive control signals to thereby charge the battery of the vehicle.

Furthermore, the restriction unit of the relay device restricts the energization between the charging station and the battery regardless of the control performed by the vehicle based on the control signal. The restriction unit restricts the energization between the charging station and the battery although the charging station and the vehicle intend to perform supply of DC power and energization between the charging station and the battery according to their respective control formats. This makes it possible to prevent the occurrence of abnormal current such as reverse current and rush current caused by the potential difference between the battery voltage and the direct current output from the charging station.

The acquisition unit of the relay device acquires a voltage value of the DC power supplied from the charging station and the voltage value of the battery, and the determination unit determines whether or not the voltage difference between the acquired voltage values is less than the threshold. In other words, it is determined whether or not a situation where abnormal current such as reverse current and rush current does not occur between the vehicle and the charging station is achieved. If it is determined that the voltage difference is less than the threshold, the release unit of the relay device releases the restriction by the restriction unit to thereby energize the charging station and the battery.

The aspect (1) thus configured can prevent the abnormal current between the vehicle and the charging station.

(2) It is preferable that the relay device further comprises a sending unit that sends, to the charging station, information for changing voltage of the DC power supplied from the charging station in the case where the determination unit determines that the voltage difference is equal to or larger than the threshold.

In this aspect, in the case where the voltage difference between the voltage value of the power supplied from the charging station and the voltage value of the battery is equal to or larger than the threshold, the sending unit of the relay device sends to the charging station the information for changing the voltage of the DC power to be supplied from the charging station. This makes it possible to adjust the voltage of the charging station for preventing abnormal current between the vehicle and the charging station.

(3) It is preferable that the vehicle is provided with a DC cutoff relay that cuts off DC power supplied from the charging station to the battery and a signal line that transmits a signal for opening or closing the DC cutoff relay. The relay device further comprises a signal cutoff relay that cuts off the signal, and the restriction unit restricts the energization by changing a state of the signal cutoff relay to an interrupted state, and the release unit releases the restriction by changing a state of the signal cutoff relay to an energized state.

In this aspect, the vehicle is provided with the DC cutoff relay that cuts off DC power supplied from the charging station to the battery and the signal line that transmits a signal for opening or closing the DC cutoff relay. The vehicle controls the energization between the charging station and the battery by opening or closing the DC cutoff relay. That is, the signal for opening or closing the DC cutoff relay is output from the outside of the relay device, and thus, control of opening or closing of the DC cutoff relay is performed at the outside of the relay device.

Meanwhile, the relay device is provided with the signal cutoff relay that cuts off the signal, and cuts off the signal for opening or closing the DC cutoff relay by opening the signal cutoff relay to thereby restrict the control on the DC cutoff relay. The relay device may also release the restriction by closing the signal cutoff relay.

Thus, even if the DC cutoff relay is provided on the vehicle, and a signal for opening or closing the DC cutoff relay is output from the outside of the relay device, the relay device can control the energization between the charging station and the battery to thereby prevent abnormal current.

(4) It is preferable that the vehicle is provided with a first DC cutoff relay that cuts off DC power supplied from the charging station to the battery. The relay device further comprises a second DC cutoff relay that cuts off DC power supplied from the charging station to the battery regardless of control performed by the vehicle based on the control signal, and the restriction unit restricts the energization by changing a state of the second DC cutoff relay to an cutoff state, and the release unit releases the restriction by changing a state of the DC cutoff relay to an energized state.

In this aspect, the vehicle is provided with the first DC cutoff relay that cuts off the DC power supplied from the charging station to the battery and the signal line for transmitting a signal for opening or closing the DC cutoff relay. The vehicle controls the energization between the charging station and the battery by opening or closing the first DC cutoff relay. The signal for opening or closing the DC cutoff relay is output from the outside of the relay device similarly to the aspect (3), and thus, control of opening or closing the DC cutoff relay is performed at the outside of the relay device.

Meanwhile, the relay device is provided with the second DC cutoff relay independent from the first DC cutoff relay, and restricts the energization between the charging station and the battery by opening the second DC cutoff relay regardless of whether the first DC cutoff relay is opened or closed. The relay device can also release the restriction by closing the second DC cutoff relay.

Thus, even if the first DC cutoff relay is provided on the vehicle and the relay device is configured so as not to be able to cut off a signal for opening or closing the first DC cutoff relay, the relay device may control the energization between the charging station and the battery to thereby prevent abnormal current. The occurrence of abnormal current between the vehicle and the charging station can be prevented even if the relay device is configured to be provided at the outside of the vehicle, for example.

(5) It is preferable that the relay device further comprises a lock unit that locks a connector connecting the charging station with the vehicle.

According to this aspect, the lock unit for locking the connector connecting the charging station with the vehicle is provided, which prevents the connector from being disengaged unintentionally due to misoperation by the operator, mischief or the like. By avoiding disengagement of the connector, the occurrence of unexpected abnormal current can be prevented. By avoiding disengagement of the connector, the safety of the user can be ensured.

(6) The relay device according to one aspect of the present disclosure converting a control signal related to charging from one format to another and relaying the converted control signal between a first communication unit that is provided on a vehicle having a battery and that sends and receives a control signal related to charging in a first format and a second communication unit that is provided on a charging station for supplying DC power to charge the battery and that sends and receives a control signal related to charging in a second format further comprises: a backflow prevention diode that prevents current from flowing back to the charging station from the battery regardless of control performed by the vehicle based on the control signal.

In this aspect, the relay device relays control signals that are to be sent and received between the vehicle and the charging station. The vehicle performs charge control by sending and receiving a control signal of the first format while the charging station performs supply control of DC power by sending and receiving a control signal of the second format. In the case where the relay device receives a control signal sent from any one of the vehicle and the charging station, the relay device converts the received control signal from one format to another and sends to the other one of the vehicle and the charging station the control signal of the converted format to thereby relay the control signal. Thus, the relay device according to this aspect allows the vehicle and the charging station having different control formats to send and receive control signals to thereby charge the battery of the vehicle.

Furthermore, the backflow prevention diode of the relay device restricts energization from the battery to the charging station regardless of control performed by the vehicle based on the control signal. The energization from the battery to the charging station is restricted by the backflow prevention diode although the charging station and the vehicle intend to perform supply of DC power and energization between the charging station and the battery according to their respective control formats. Thus, the occurrence of the reverse current flowing back to the charging station from the battery can be prevented.

When no reverse current flowing back to the charging station from the battery occurs, current flows from the charging station to the battery, which allows the charging station and the battery to be energized.

This aspect (6) thus configured can prevent the occurrence of the reverse current flowing from the battery to the charging station.

[Detailed Description of the Present Application]

Examples of the charge communication system having the relay device according to the embodiments of the present application will be described below in detail with reference to the drawings. It is to be understood that the embodiments herein disclosed are illustrative in all respects and not restrictive, and all changes that fall within the meanings and the bounds of the claims, or equivalence of such meanings and bounds are intended to be embraced by the claims.

Embodiment 1

Figure 1:
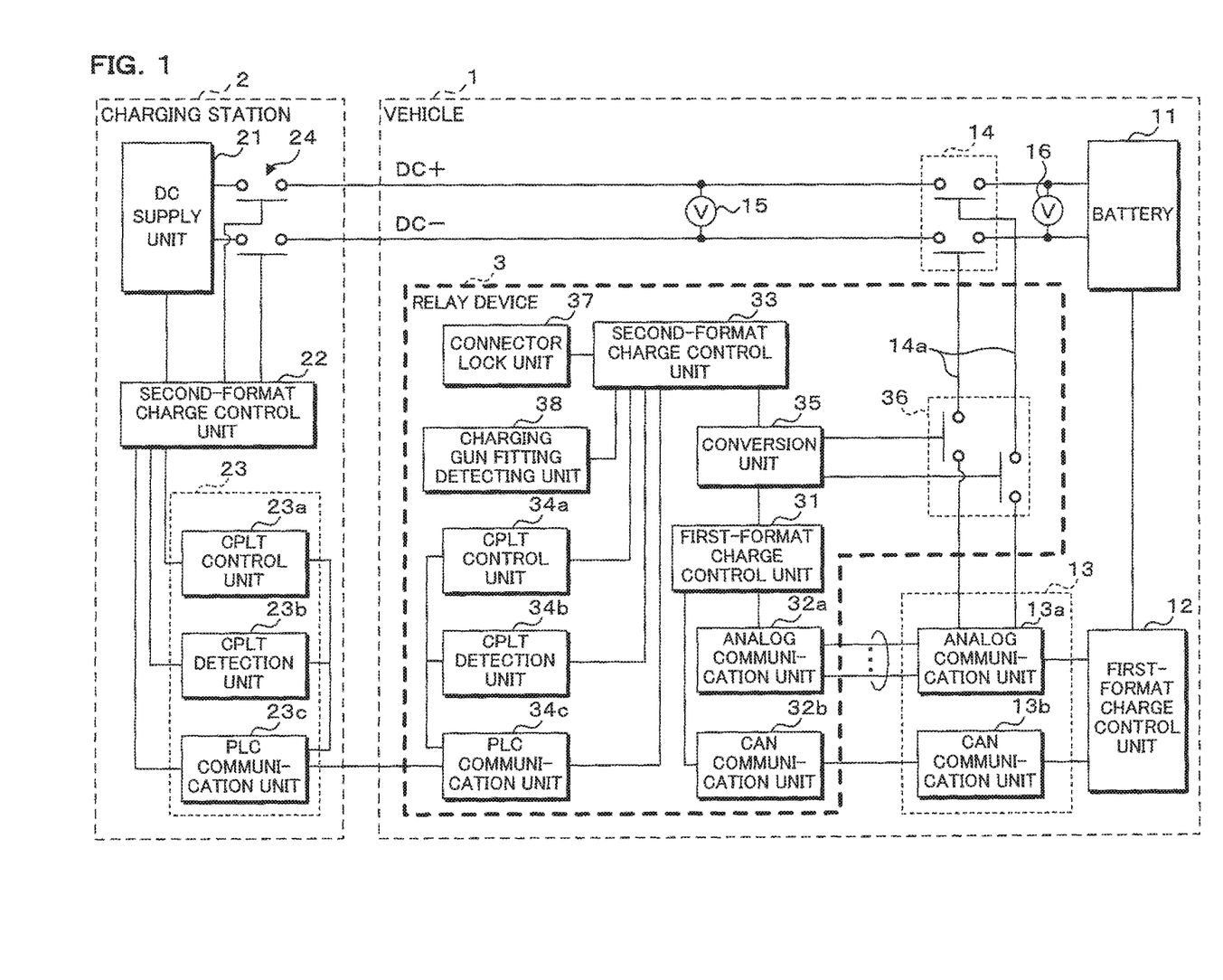
FIG. 1 is a block diagram illustrating one example of the configuration of a charge communication system according to Embodiment 1 of the present disclosure.

FIG. 1 is a block diagram illustrating one example of the configuration of a charge communication system according to Embodiment 1. The charge communication system of Embodiment 1 includes a vehicle 1 such as a plug-in hybrid electric vehicle and an electric vehicle, and a charging station 2 for supplying DC power to a battery 11 of the vehicle 1 through a charging cable.

The charging cable has one end connected to the charging station 2 and the other end provided with a charging gun (not illustrated). The charging cable includes two electric supply lines, a communication line, a ground line (not illustrated) and so on. When the charging gun is connected to the inlet of the vehicle 1, the electric supply lines are connected to the battery 11, and the communication line is connected to a relay device 3 described later. The ground line is connected to the reference potential of the vehicle body or the like. Each of the electric supply line is a conducting wire to which DC power output from the charging station 2 is applied. The communication line is a conducting wire through which a control signal of a second format for controlling charging of the battery 11 mounted on the vehicle 1 is transmitted.

The charging station 2 includes a DC supply unit 21, a second-format charge control unit 22 and a second communication unit 23. The DC supply unit 21 is connected to the power supply line via a stand-side relay 24, and the DC power output from the DC supply unit 21 is supplied to the vehicle 1 through the power supply line.

The second-format charge control unit 22 is a microcomputer including a CPU, a ROM, a RAM and so on. The second-format charge control unit 22 sends and receives control signals of the second format through the second communication unit 23, and controls opening and closing of the stand-side relay 24 and supplying of DC power.

The second communication unit 23 is a communication device for sending and receiving control signals of the second format related to charging, such as control signals in the Combo format. The second communication unit 23 is provided with a CPLT control unit 23a, a CPLT detection unit 23b and a PLC communication unit 23c.

The CPLT control unit 23a and the CPLT detection unit 23b are connected to the communication line and the ground line of the charging cable via the PLC communication unit 23c, and send and receive control pilot signals through the communication line. The control pilot signal is a rectangular wave signal of 1 kHz, for example. The CPLT control unit 23a controls outputting and stopping of a control pilot signal. The CPLT detection unit 23b is a circuit for detecting the potential or the like of a control pilot signal. The CPLT control unit 23a and the CPLT detection unit 23b send and receive information related to charging such as confirmation of the connection between the charging station 2 and the vehicle 1, charging capability, a state of charge etc., to/from the vehicle 1.

The PLC communication unit 23c exchanges the information related to charging with the vehicle 1 by sending and receiving a control signal, which is a differential signal having a higher frequency than the control pilot signal, e.g., the control signal of 2-30 MHz, superposed onto the control pilot signal.

The vehicle 1 is provided with a battery 11 for driving the vehicle 1, a first-format charge control unit 12, a first communication unit 13, a DC cutoff relay 14 and a relay device 3. The vehicle 1 is provided with an inlet (not illustrated) to which the connector of the charging gun is to be connected, the inlet having a DC supply terminal, a communication terminal and a ground terminal to which the power supply line, the communication line and the ground line of the charging cable are respectively connected. The DC supply terminal is connected to the battery 11 via the DC cutoff relay 14, which allows the battery 11 to be charged with the DC power supplied from the charging station 2. The communication line is connected to the relay device 3, which allows the first communication unit 13 to send and receive control signals of the first format to and from the charging station 2 via the relay device 3.

The first-format charge control unit 12 is a microcomputer including a CPU, a ROM, a RAM and so on. The first-format charge control unit 12 sends and receives control signals of the first format through the first communication unit 13 to thereby perform opening or closing of the DC cutoff relay 14 and charge control of the battery 11.

The first communication unit 13 is a communication device for sending and receiving control signals of the first format related to charging, such as control signals in the CHAdeMO standard. The first communication unit 13 is provided with an analog communication unit 13a and a CAN communication unit 13b. The analog communication unit 13a is connected to the relay device 3 via multiple analog lines, and is a circuit for sending and receiving analog control signals to and from the relay device 3. The analog communication unit 13a is composed of a photocoupler, a transistor switch and so on. The analog communication unit 13a can detect the level of the voltage of the analog lines by the photocoupler and can control the level of the voltage of the analog lines by on-off control of the transistor switch. The analog communication unit 13a can thus transmit an analog control signal by on-off control of the transistor switch and can receive a control signal sent from the relay device 3 by monitoring the on-off state of the photocoupler. The CAN communication unit 13b is a circuit for sending and receiving control signals to and from the relay device 3 according to the CAN communication protocol. The CAN communication unit 13b sends and receives information on the charging station 2 and the battery 11, information on a charged current amount and so on.

The DC cutoff relay 14 is a relay for cutting off the DC power supplied from the charging station 2 to the battery 11. A signal line 14a through which signals for opening or closing the DC cutoff relay 14 is transmitted is connected to the analog line of the analog communication unit 13a, and has a control relay (not illustrated) interposed in the middle thereof. When the analog communication unit 13a shifts to a predetermined state to make the signal transmittable, the control relay is opened or closed by the control signal output from the first-format charge control unit 12 to thereby control the DC cutoff relay 14 between an opened state and a closed state.

The vehicle 1 is further provided with a first voltage detecting unit 15 and a second voltage detecting unit 16. The first voltage detecting unit 15 is disposed between the inlet and the DC cutoff relay 14. The first voltage detecting unit 15 is a voltmeter for detecting a voltage value of the DC power supplied from the charging station 2 when the vehicle 1 is connected with the charging station 2, and outputs the information on the detected voltage of the DC power to the relay device 3 and the first-format charge control unit 12.

The second voltage detecting unit 16, which is disposed between the DC cutoff relay 14 and the battery 11, is a voltmeter for detecting battery voltage and outputs the information on the detected battery voltage to the relay device 3 and the first-format charge control unit 12.

The relay device 3 converts the control signal from one format to another between the first communication unit 13 provided on the vehicle 1 and the second communication unit 23 provided on the charging station 2, and relays the converted control signal. The relay device 3 is provided with a first-format charge control unit 31 for sending and receiving control signals of the first format to and from the first communication unit 13 provided on the vehicle 1, an analog communication unit 32a and a CAN communication unit 32b.

The first-format charge control unit 31 is a microcomputer including a CPU, a ROM, a RAM and so on. The first-format charge control unit 31 sends and receives control signals of the first format to and from the first communication unit 13 through the analog communication unit 32a and the CAN communication unit 32b. The first-format charge control unit 31 outputs a control signal received from the first communication unit 13 to a conversion unit 35 described later and sends a control signal output from the conversion unit 35 to the first communication unit 13.

The analog communication unit 32a, which is connected to the analog communication unit 13a relating to the first communication unit 13 through multiple analog lines, is a circuit for sending and receiving analog control signals to and from the first communication unit 13. The analog communication unit 32a is composed of a photocoupler, a transistor switch and so on, and sends and receives control signals similarly to the analog communication unit 13a of the first communication unit 13.

The CAN communication unit 32b is a circuit for sending and receiving control signals according to the CAN communication protocol to and from the CAN communication unit 13b relating to the first communication unit 13. The CAN communication unit 32b sends and receives information on the charging station 2 and the battery 11, information on a charged current amount and so on.

The relay device 3 is further provided with a second-format charge control unit 33 for sending and receiving control signals of the second format to and from the second communication unit 23 provided on the charging station 2, a CPLT control unit 34a, a CPLT detection unit 34b and a PLC communication unit 34c.

The second-format charge control unit 33 is a microcomputer including a CPU, a ROM, a RAM and so on. The second-format charge control unit 33 sends and receives control signals of the second format to and from the second communication unit 23 through the CPLT control unit 34a, the CPLT detection unit 34b and the PLC communication unit 34c. The second-format charge control unit 33 outputs a control signal received from the second communication unit 23 to the conversion unit 35 and sends a control signal output from the conversion unit 35 to the charging station 2.

When the charging gun is connected to the vehicle 1, the PLC communication unit 34c is connected to the communication line and the ground line of the charging cable while the CPLT control unit 34a and the CPLT detection unit 34b send and receive control pilot signals via the PLC communication unit 34c. The CPLT control unit 34a controls the voltage level of a control pilot signal. The CPLT detection unit 34b is a circuit for detecting the state of a control pilot signal. The CPLT detection unit 34b can detect the connection with the charging station 2 that is capable of DC charging by detecting a control pilot signal having a duty ratio of 5%, for example.

The PLC communication unit 34c exchanges information on charging with the second communication unit 23 of the charging station 2 by sending and receiving a control signal, which is a differential signal having a frequency higher than the control pilot signal, e.g., the control signal of 2-30 MHz, superposed on the control pilot signal.

The relay device 3 is further provided with the conversion unit 35, a signal cutoff relay 36, a connector lock unit 37 and a charging gun fitting detecting unit 38.

The conversion unit 35 is a microcomputer including a CPU, a ROM, a RAM and so on, and stores correspondences between control signals of the first format and control signals of the second format. In the case where the conversion unit 35 receives an input of a control signal of the first format output from the first-format charge control unit 31, the conversion unit 35 converts the control signal of the first format to a corresponding control signal of the second format and outputs the converted control signal to the second-format charge control unit 33. Similarly, in the case where the conversion unit 35 receives an input of a control signal of the second format output from the second-format charge control unit 33, the conversion unit 35 converts the control signal of the second format to a corresponding control signal of the first format and outputs the converted control signal to the first-format charge control unit 31.

The signal cutoff relay 36, which is interposed in the signal line 14a, is a relay for cutting off a signal to open or close the DC cutoff relay 14 by opening or closing the signal line 14a. The opening or closing of the signal cutoff relay 36 is controlled by the conversion unit 35. When the signal cutoff relay 36 is opened, the DC cutoff relay 14 cannot be closed regardless of the control by the first-format charge control unit 12. When the signal cutoff relay 36 is closed, the DC cutoff relay 14 can be opened or closed in accordance with the control of the first-format charge control unit 12.

The connector lock unit 37 is a lock mechanism for locking the connector of the charging gun that is connected to the inlet of the vehicle 1. For example, the charging gun and the inlet are respectively provided with a claw portion and an engaged portion for being engaged with the claw portion. The connector lock unit 37 is provided with a restriction member for restricting the movement of the claw portion so that the claw portion engaged with the engaged portion stays engaged. The restriction member is disposed to be movable between a locked position where the movement of the claw portion is restricted and an unlocked position where the movement of the claw portion is permitted. The connector lock unit 37 is also provided with an actuator for moving the restriction member, and by moving the restriction member with the actuator, the connector is locked or unlocked. Such an operation by the actuator is performed by the second-format charge control unit 33.

The charging gun fitting detecting unit 38 is a switch that is turned on or off when the charging gun is connected to the inlet, for example, and the switch outputs to the second-format charge control unit 33 a signal corresponding to an on state or an off state, that is, a signal corresponding to a connected state of the charging gun.

The following describes the outline of the processing procedure from the start to the end of the charging of the battery 11.

Figure 2:
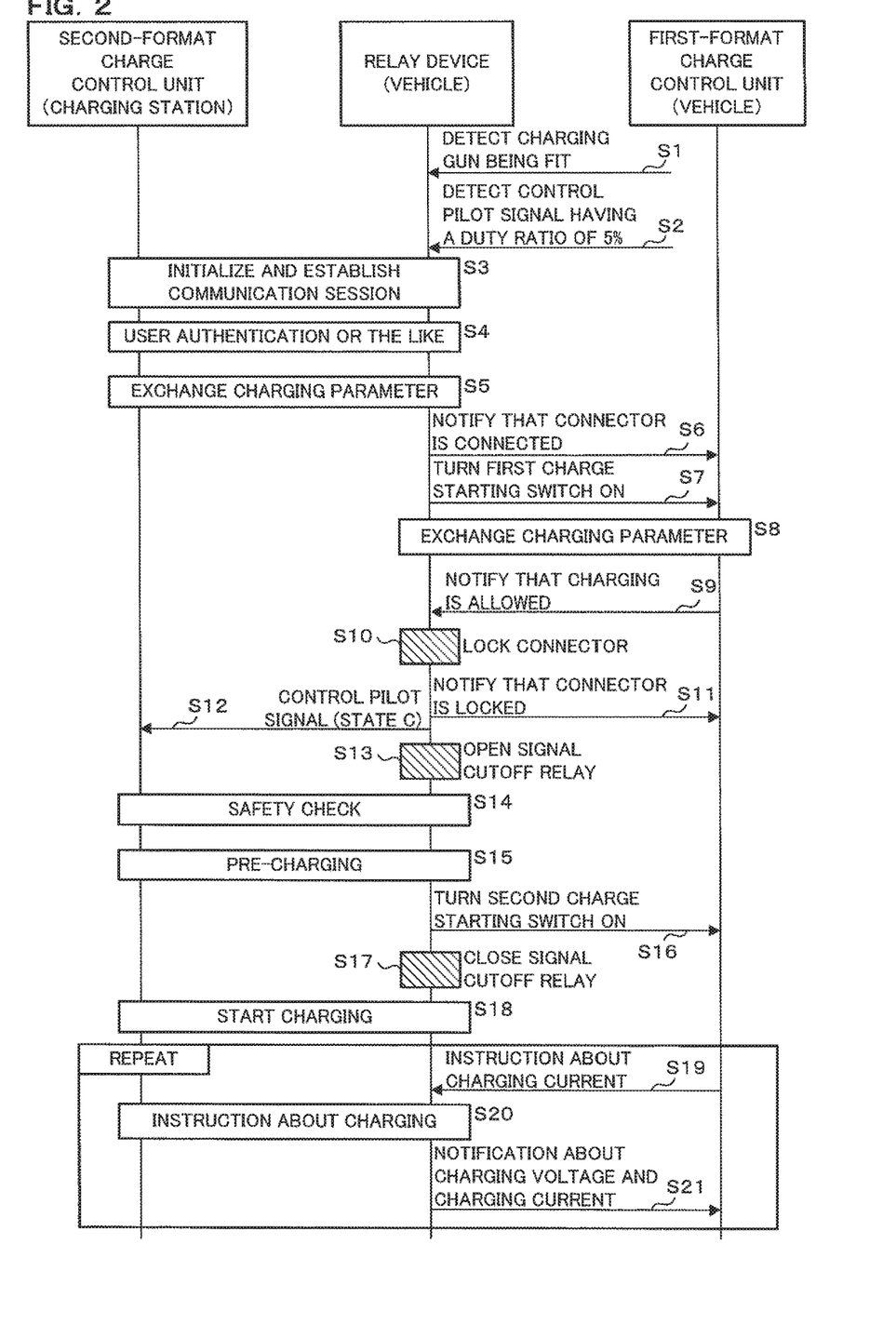
FIG. 2 is a sequence diagram illustrating the procedure of relay processing relating to charge control.
Figure 3:
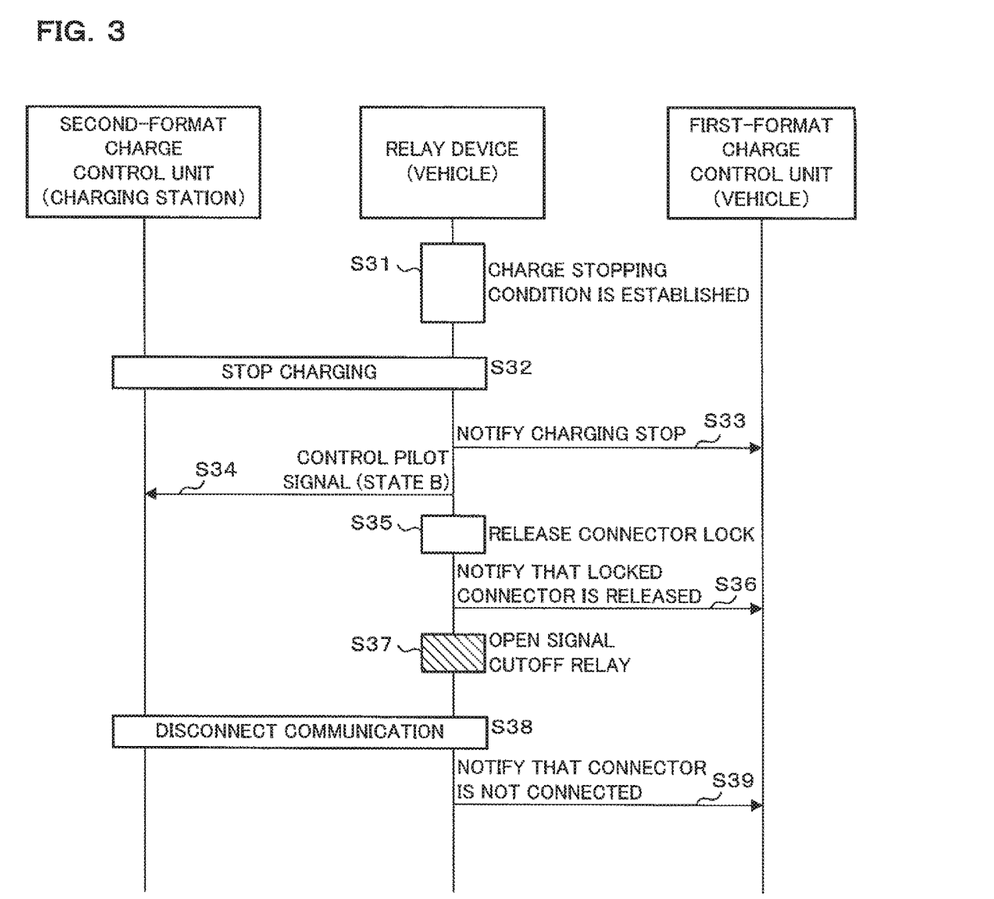
FIG. 3 is a sequence diagram illustrating the procedure of relay processing relating to charge stopping control.

FIG. 2 is a sequence diagram illustrating the procedure of relay processing relating to charge control while FIG. 3 is a sequence diagram illustrating the procedure of relay processing relating to charge stopping control. In the case where the charging gun fitting detecting unit 38 detects the connector of the charging gun being fit into the inlet (step S1), and the CPLT detection unit 34b detects a control pilot signal having a duty ratio of 5% (step S2), the second-format charge control unit 22 of the charging station 2 and the relay device 3 initialize the communication session by sending and receiving control signals to establish communication (step S3). It is noted that the voltage level of the control pilot signal is 9 V and is in a so-called state B. The second-format charge control unit 22 of the charging station 2 and the relay device 3 further perform various processing such as user authentication (step S4) and exchange various parameters required to charge the battery 11 (step S5).

Next, the relay device 3 notifies the first-format charge control unit 12 in the vehicle 1 that the connector is connected (step S6) and turns a first charge starting switch on by the analog communication unit 32a (step S7). When the analog communication unit 13a detects the first charge starting switch being tuned on, the first-format charge control unit 12 starts CAN communication. The first-format charge control unit 31 of the relay device 3 makes CAN communication with the first-format charge control unit 12 to exchange charging parameters (step S8). In the case where the charging parameters of the charging station 2 conform to those of the battery 11 of the vehicle 1, the first-format charge control unit 12 notifies the relay device 3 through the analog communication unit 13a that charging is allowed (step S9).

The relay device 3 that has received the notification that charging is allowed locks the connector of the charging gun at the connector lock unit 37 (step S10). The relay device 3 notifies the first-format charge control unit 12 that the connector is locked (step S11).

The relay device 3 then performs control to change a state of the control pilot signal to a state C by the CPLT control unit 34a (step S12). The state C indicates a state in which the voltage level of the control pilot signal is 6 V, and preparing for charging is completed on the vehicle 1 side.

Next, the relay device 3 opens the signal cutoff relay 36 (step S13), performs safety check with the charging station 2 (step S14), and performs pre-charging (step S15). In the case where the results of the safety check and pre-charging prove no problems, the relay device 3 turns a second charge starting switch on by the analog communication unit 32*a* (step S16) and closes the signal cutoff relay 36 (step S17). The detail of a control procedure for closing the signal cutoff relay 36 will be described below.

The relay device 3 sends and receives control signals to and from the charging station 2 to thereby cause the charging station 2 to start charging the battery 11 (step S18). During charging, the relay device 3 receives through the CAN communication unit 32*b* an instruction about charging current sent from the first-format charge control unit 12 (step S19). The relay device 3 then sends the received instruction about charging current to the charging station 2 through the PLC communication unit 34*c*, receives a notification about charging voltage, charging current or the like that is sent from the charging station 2 (step S20), and sends through the CAN communication unit 32*b* the received information such as charging voltage, charging current or the like to the first-format charge control unit 12 (step S21).

The first-format charge control unit 12, the relay device 3 and the second-format charge control unit 22 perform charge control by repeatedly executing the processing from step S19 to step S21.

The relay device 3 monitors a charge stopping condition during charging. For example, the relay device 3 monitors by the CAN communication unit 32*b* a charge stopping request sent from the second-format charge control unit 22 and determines that a charge stopping condition is established in the case where a charge stopping request is sent from the second-format charge control unit 22. If it is determined that the charge stopping condition is established (step S31), the relay device 3 notifies the second-format charge control unit 22 of charge stopping through the PLC communication unit 34*c*, and the second-format charge control unit 22 stops supplying the DC power in response to the reception of the notification of the charging stop (step S32).

Subsequently, the relay device 3 notifies the first-format charge control unit 12 of charging stop (step S33) and performs control to change a state of the control pilot signal to the state B by the CPLT control unit 34*a* (step S34). The relay device 3 then releases the locked state by the connector lock unit 37 (step S35) and notifies the first-format charge control unit 12 that the locked state of the connector is released (step S36).

Next, the relay device 3 opens the signal cutoff relay 36 (step S37), executes processing relating to communication disconnection from the second-format charge control unit 22 of the charging station 2 (step S38), and notifies the first-format charge control unit 12 of the vehicle 1 that the connector is not connected (step S39).

According to the above-described processing procedure, the battery of the vehicle 1 is charged. The following describes the principle part of the processing procedure relating to opening or closing of the signal cutoff relay 36 for preventing abnormal current. More specifically, the detail of the processing procedure of the opening part at step S13 and the closing part at step S17 illustrated in FIG. 2 will be described.

Figure 4:
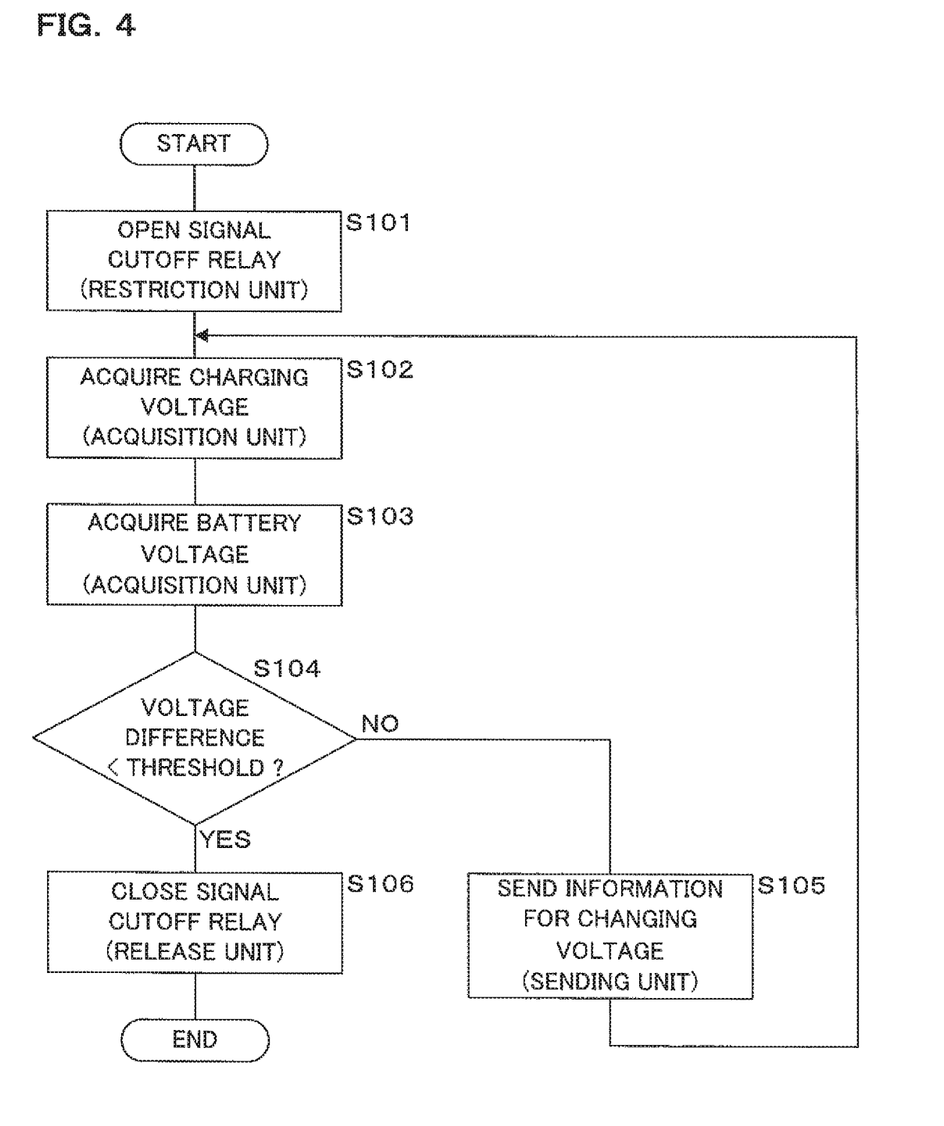
FIG. 4 is a flowchart illustrating the processing procedure relating to energization control.

FIG. 4 is a flowchart illustrating the processing procedure relating to energization control. The conversion unit 35 outputs an open signal to the signal cutoff relay 36 at a predetermined timing to open the signal cutoff relay 36 (step S101). That is, the conversion unit 35 performs restriction on the energization between the charging station 2 and the battery 11 by performing control on the signal cutoff relay 36 to change a state of that to an interrupted state, to thereby make the DC cutoff relay 14 unclosed regardless of the control by the first-format charge control unit 12. It is noted that the predetermined timing is not restricted to the specific timing as long as the timing is before DC power is supplied from the charging station 2 and control for closing the signal cutoff relay 36 is performed.

The conversion unit 35 then acquires a voltage value of the DC power detected by the first voltage detecting unit 15 (step S102) and acquires a voltage value of the battery detected by the second voltage detecting unit 16 (step S103). Next, the conversion unit 35 determines whether or not the voltage difference between the voltage value of the DC power acquired at step S102 and the voltage value of the battery acquired at step S103 is less than a threshold (step S104).

If it is determined that the voltage difference between the voltage value of the DC power and the voltage value of the battery is equal to or larger than the threshold (step S104: NO), the conversion unit 35 sends information for changing the voltage of the DC power to be supplied from the charging station 2 to the charging station 2 through the PLC communication unit 34*c* (step S105) and returns the processing to step S102. More specifically, the conversion unit 35 requests the second-format charge control unit 33 to send the information for changing the voltage of the DC power. In accordance with the control of the second-format charge control unit 33, the PLC communication unit 34*c* sends a control signal having the information to the charging station 2. The second-format charge control unit 22 of the charging station 2 receives the control signal sent from the vehicle 1 and changes the voltage of the DC power according to the received control signal.

If it is determined that the voltage difference between the voltage value of DC power and the voltage value of the battery is less than the threshold (step S104: YES), the conversion unit 35 outputs a close signal to the signal cutoff relay 36 to close the signal cutoff relay 36 (step S106), and ends the processing. In other words, the conversion unit 35 releases the restriction on the energization between the charging station 2 and the battery 11 by performing control on the signal cutoff relay 36 to change a state of that to the energized state.

By converting control signals that are different in format and are to be sent and received between the vehicle 1 and the charging station 2 from one format to another and relaying it, the relay device 3 according to Embodiment 1 thus configured can send and receive the control signals regardless of the difference in the charging standards between the vehicle 1 and the charging station 2 and charge the battery 11 of the vehicle 1. Furthermore, the relay device 3 performs control on the DC cutoff relay 14 so that it is not closed until the voltage difference between the voltage value of the battery 11 and the voltage value of the DC power output by the charging station 2 becomes lower than the predetermined threshold. This structure prevents the occurrence of abnormal current such as reverse current and rush current caused by the potential difference between the battery voltage and the voltage of the DC power output from the charging station 2.

Moreover, in the case where the voltage difference between the voltage value of the battery 11 and the voltage value of the DC power output from the charging station 2 is equal to or larger than the threshold, the relay device 3 can adjust the voltage of the charging station 2 for preventing abnormal current between the vehicle 1 and the charging station 2.

Furthermore, the relay device 3 can cut off the transmission of the signal for controlling the DC cutoff relay 14 by the signal cutoff relay 36. This allows the relay device 3 to control the energization between the charging station 2 and the battery 11 regardless of the first-format charge control unit 12 performing closing control on the DC cutoff relay 14 to thereby prevent abnormal current.

In addition, the relay device 3 is provided with the connector lock unit 37 for locking the connector of the charging gun. This structure prevents the connector of the charging gun from being disengaged from the inlet of the vehicle 1 unintentionally due to misoperation by the operator, mischief or the like. By avoiding disengagement of the connector, the occurrence of unexpected abnormal current can be prevented. By avoiding disengagement of the connector, safety can be ensured.

Embodiment 2

A relay device according to Embodiment 2 is provided outside the vehicle and different in a cutoff manner of DC power, and thus, the following mainly describes the difference. The other configurations and effects are similar to those of Embodiment 1 and thus the parts corresponding to Embodiment 1 are denoted by similar reference codes while the detailed description thereof will not be repeated.

Figure 5:
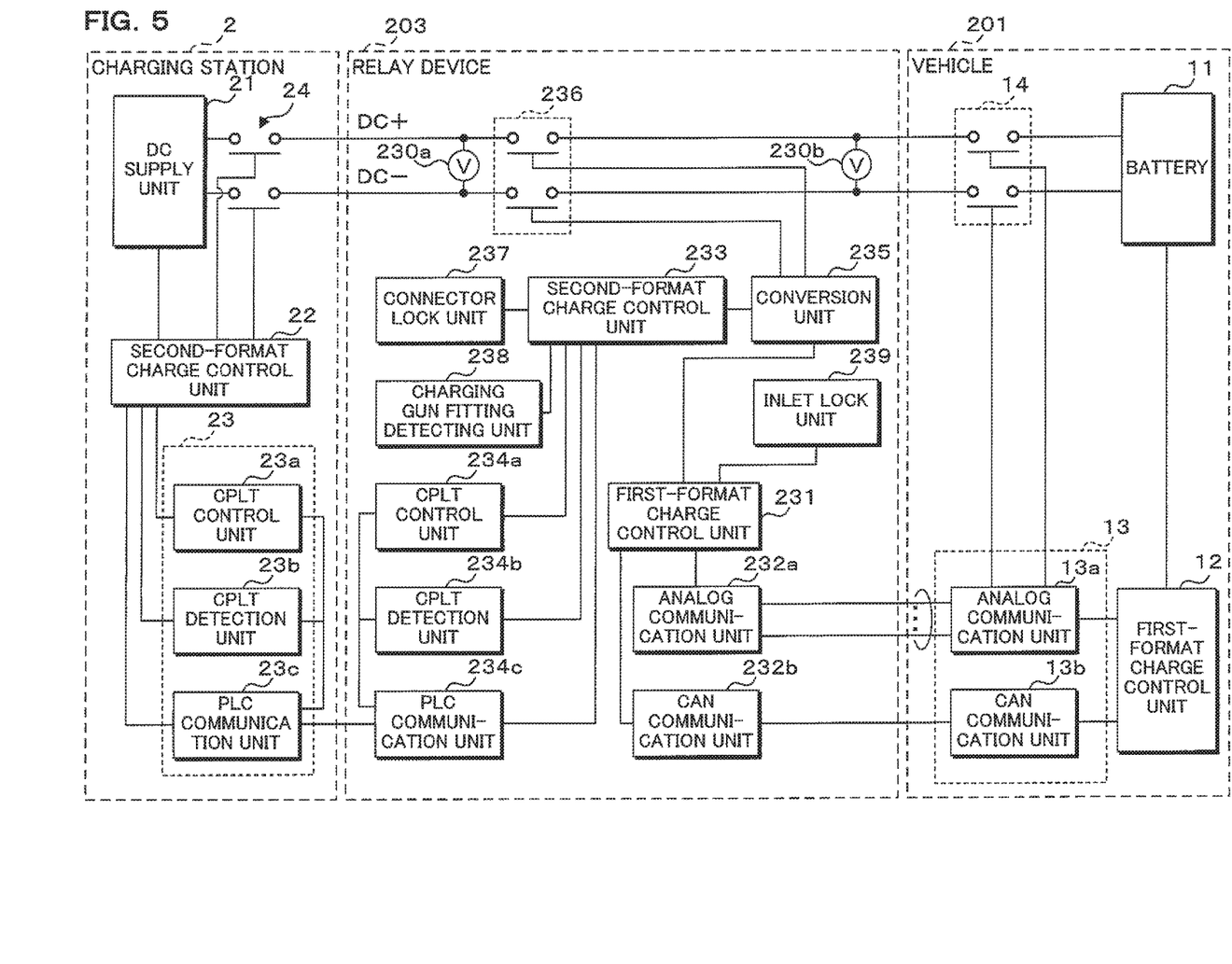
FIG. 5 is a block diagram illustrating one example of the configuration of a charge communication system according to Embodiment 2 of the present disclosure.

FIG. 5 is a block diagram illustrating one example of the configuration of a charge communication system according to Embodiment 2 of the present disclosure. A vehicle 201 according to Embodiment 2 is provided with the battery 11, the first-format charge control unit 12, the first communication unit 13 and the first DC cutoff relay 14 similarly to Embodiment 1. It is noted that a relay device 203 is mounted not on the vehicle 201 according to Embodiment 2 but on the connector of the charging cable.

The relay device 203 is provided with a first connection portion (not illustrated) to be connected to the connector of the charging gun and a second connection portion to be connected to the inlet of the vehicle 201, and functions as an adapter that connects the charging gun concerning the second format with the inlet of the vehicle 201 related to the first format. It is noted that the inlet of the vehicle 201 is configured to be connected to analog lines for transmitting a second control signal and a communication line for making CAN communication.

The relay device 203 according to Embodiment 2 is provided with a first-format charge control unit 231, an analog communication unit 232a, a CAN communication unit 232b, a second-format charge control unit 233, a CPLT control unit 234a, a CPLT detection unit 234b, a PLC communication unit 234c and a conversion unit 235.

Furthermore, the relay device 203 is provided with a second DC cutoff relay 236, which is disposed in the middle of the power supply line in place of the signal cutoff relay 36 in Embodiment 1, for cutting off DC power. Opening or closing of the second DC cutoff relay 236 is controlled by the conversion unit 235.

Furthermore, the relay device 203 is also provided with a first voltage detecting unit 230a and a second voltage detecting unit 230b. The first voltage detecting unit 230a is disposed closer to the charging station 2 compared to the second DC cutoff relay 236. The first voltage detecting unit 230a is a voltmeter for detecting a voltage value of DC power supplied from the charging station 2 and outputs the information on the detected voltage value of the DC power to the conversion unit 235. The second voltage detecting unit 230b is disposed closer to the vehicle 201 compared to the second DC cutoff relay 236. The second voltage detecting unit 230b is a voltmeter for detecting battery voltage, and outputs the information on the detected battery voltage to the conversion unit 235.

The relay device 203 is further provided with a connector lock unit 237, a charging gun fitting detecting unit 238 and an inlet lock unit 239. The connector lock unit 237 and the charging gun fitting detecting unit 238 have configurations similar to those in Embodiment 1. The inlet lock unit 239 also has a configuration similar to that of the connector lock unit 237 and electromagnetically locks the second connection portion connected to the inlet of the vehicle 201. The operation of the inlet lock unit 239 is controlled by the first-format charge control unit 231.

The processing procedure performed by the conversion unit 235 according to Embodiment 2 is similar to that of Embodiment 1. At the start of charging, the relay device 203 outputs an open signal to the second DC cutoff relay 236 to thereby change a state of the second DC cutoff relay 236 to a cutoff state. Thus, by performing control on the second DC cutoff relay 236 to change a state of that to the cutoff state, the energization between the charging station 2 and the battery 11 can be restricted regardless of the control by the first-format charge control unit 12. Next, the conversion unit 235 acquires a voltage value of the DC power detected by the first voltage detecting unit 230a and the battery voltage detected by the second voltage detecting unit 230b. The conversion unit 235 then determines whether or not the voltage difference between the acquired the voltage value of the DC power and the acquired battery voltage value is less than a threshold. If it is determined that the voltage difference between the voltage value of the DC power and the voltage value of the battery voltage is less than the threshold, the conversion unit 235 outputs a close signal to the second DC cutoff relay 236 to thereby close the second DC cutoff relay 236, and ends the processing. In other words, the conversion unit 235 releases the restriction on the energization between the charging station 2 and the battery 11 by performing control on the second DC cutoff relay 236 to change a state of that to the energized state. If it is determined that the voltage difference between the voltage value of the DC power and the battery voltage is equal to or larger than the threshold, the conversion unit 235 sends information for changing the DC power supplied from the charging station 2 to the charging station 2 through the PLC communication unit 234c.

A relay device 203 according to Embodiment 2 can prevent abnormal current such as reverse current and rush current by controlling the energization between the charging station 2 and the battery 11 even if the relay device 203 is configured to be provided outside the vehicle 201 including the first DC cutoff relay 14. The other operations and effects are similar to those in Embodiment 1.

Embodiment 3

The relay device according to Embodiment 3 is different from Embodiment 1 in a cutoff manner of DC power, and thus, the following mainly describes the difference. The other configurations and effects are similar to those of Embodiment 1 and thus, the parts corresponding to Embodiment 1 are denoted by similar reference codes while the detailed description thereof will not be repeated.

Figure 6:
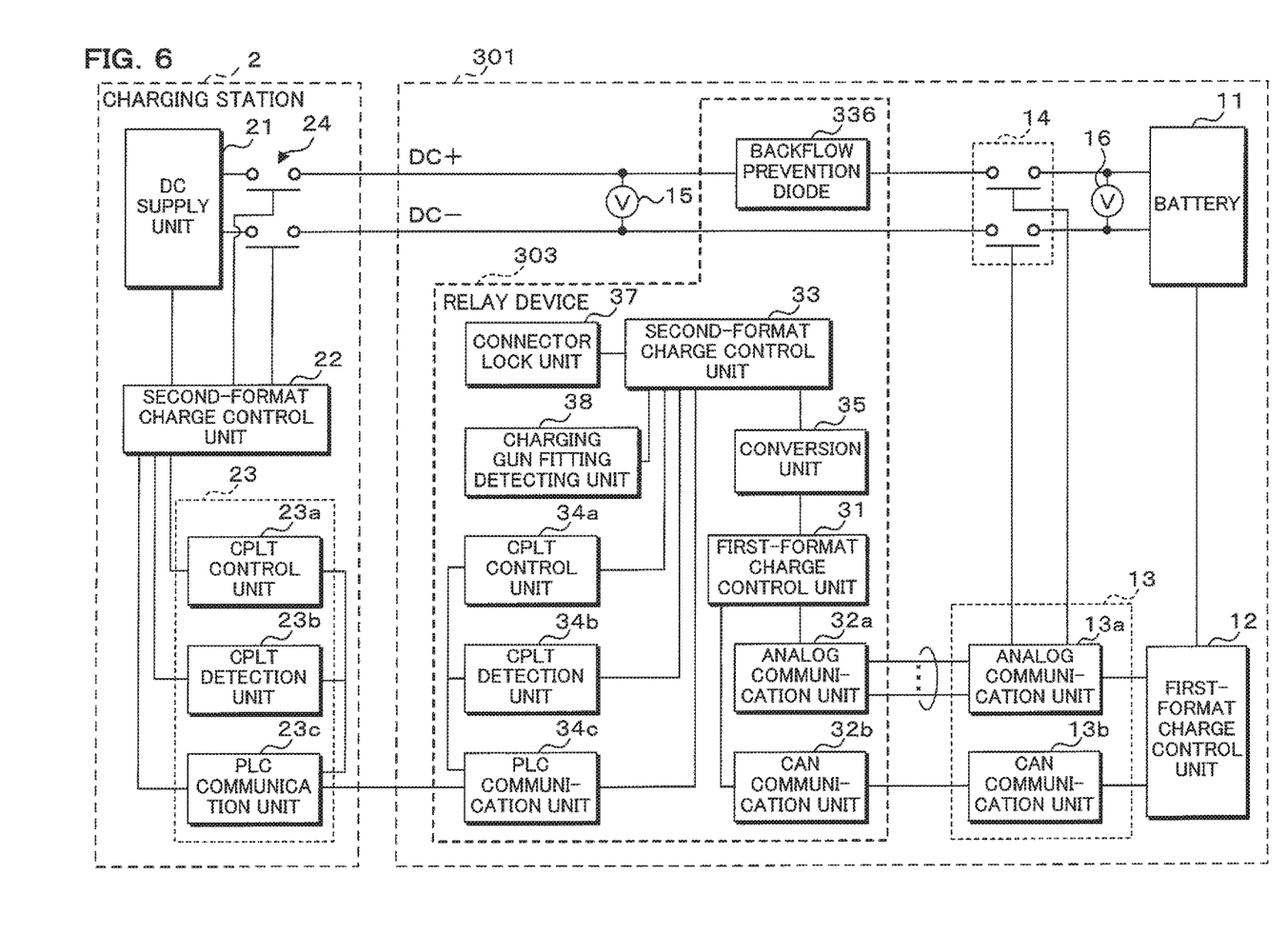
FIG. 6 is a block diagram illustrating one example of the configuration of a charge communication system according to Embodiment 3 of the present disclosure.

FIG. 6 is a block diagram illustrating one example of the configuration of a charge communication system according to Embodiment 3 of the present disclosure. A relay device 303 according to Embodiment 3 is provided with a backflow prevention diode 336 interposed in the power supply line in place of the signal cutoff relay 36. The backflow prevention diode 336 is forwardly connected from the charging station 2 to the battery 11, which prevents current from flowing back to the charging station 2 from the battery 11.

The relay device 303 according to Embodiment 3 can restrict the energization from the battery 11 to the charging station 2 by the backflow prevention diode 336 although the charging station 2 and the vehicle 301 intend to perform supply of DC power and energization between the charging station 2 and the battery 11 according to their respective control formats. Especially, at the start of charging, the DC cutoff relay 14 disposed closer to the vehicle 301 may be closed before increase of the voltage of the DC power output from the charging station 2. However, interposition of the backflow prevention diode 336 can prevent current from flowing back to the charging station 2 from the battery 11.

Embodiment 4

A relay device according to Embodiment 4 is different from Embodiment 2 in a cutoff manner of DC power, and thus, the following mainly describes the difference. The other configurations and effects are similar to those of Embodiment 2 and thus, the parts corresponding to Embodiment 2 are denoted by similar reference codes while the detailed description thereof will not be repeated.

Figure 7:
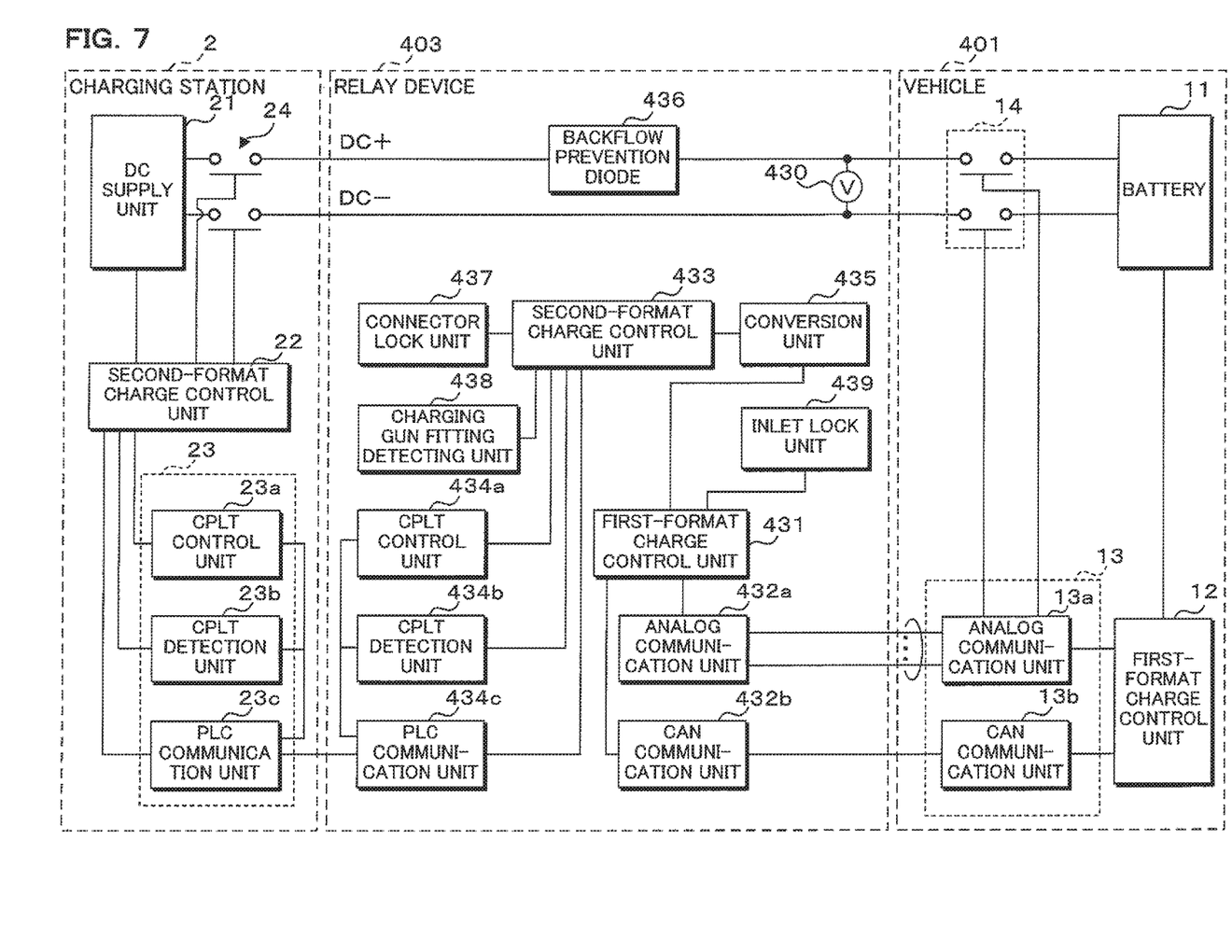
FIG. 7 is a block diagram illustrating one example of the configuration of a charge communication system according to Embodiment 4 of the present disclosure.

FIG. 7 is a block diagram illustrating one example of the configuration of a charge communication system according to Embodiment 4 of the present disclosure. A relay device 403 according to Embodiment 4 is provided with a first-format charge control unit 431, an analog communication unit 432a, a CAN communication unit 432b, a second-format charge control unit 433, a CPLT control unit 434a, a CPLT detection unit 434b, a PLC communication unit 434c, a conversion unit 435, a connector lock unit 437, a charging gun fitting detecting unit 438, an inlet lock unit 439 and a voltage detection unit 430. The relay device 403 according to Embodiment 4 is provided with a backflow prevention diode 436 interposed in the power supply line in place of the second DC cutoff relay 236. The backflow prevention diode 436 is forwardly connected from the charging station 2 to the battery 11, which prevents current from flowing back to the charging station 2 from the battery 11.

The relay device 403 according to Embodiment 4 can restrict the energization from the battery 11 to the charging station 2 by the backflow prevention diode 436 although the charging station 2 and the vehicle 401 intend to perform supply of DC power and energization between the charging station 2 and the battery 11 according to their respective control formats.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A relay device converting a control signal related to charging from one format to another and relaying a converted control signal between a first communication unit that is provided on a vehicle having a battery and that sends and receives a control signal related to charging in a first format and a second communication unit that is provided on a charging station for supplying DC power to charge the battery and that sends and receives a control signal related to charging in a second format, comprising:
   a restriction unit that restricts energization between the charging station and the battery regardless of control performed by the vehicle based on the control signal;
   an acquisition unit that acquires a voltage value of the DC power supplied from the charging station and a voltage value of the battery;
   a determination unit that determines whether or not a voltage difference between the voltage values acquired by the acquisition unit is less than a threshold; and
   a release unit that releases restriction by the restriction unit if the determination unit determines that the voltage difference is less than the threshold, wherein
   the vehicle is provided with a DC cutoff relay that cuts off DC power supplied from the charging station to the battery and a signal line that transmits a signal for opening or closing the DC cutoff relay,
   the relay device comprises a signal cutoff relay that cuts off the signal, and
   the restriction unit restricts the energization by changing a state of the signal cutoff relay to an interrupted state, and the release unit releases the restriction by changing a state of the signal cutoff relay to an energized state.

2. The relay device according to claim 1, further comprising a sending unit that sends, to the charging station, information for changing voltage of the DC power to be supplied from the charging station if the determination unit determines that the voltage difference is equal to or larger than the threshold.

3. The relay device according to claim 1, wherein
   the vehicle is provided with a first DC cutoff relay that cuts off DC power supplied from the charging station to the battery,
   the relay device further comprises a second DC cutoff relay that cuts off DC power supplied from the charging station to the battery regardless of control performed by the vehicle based on the control signal, and
   the restriction unit restricts the energization by changing a state of the second DC cutoff relay to a cutoff state, and the release unit releases the restriction by changing a state of the DC cutoff relay to an energized state.

4. The relay device according to claim 1, further comprising a lock unit that locks a connector connecting the charging station with the vehicle.

* * * * *